(12) United States Patent
Robertson

(10) Patent No.: US 6,753,895 B1
(45) Date of Patent: Jun. 22, 2004

(54) TAPE ROLLER/PAD/PRINTING USING A LASER ABLATED CARRIER

(75) Inventor: John A. Robertson, Chillicothe, OH (US)

(73) Assignee: Infosight Corporation, Chillothe, OH (US)

(*) Notice: Subject to any disclaimer, the term of this patent is extended or adjusted under 35 U.S.C. 154(b) by 17 days.

(21) Appl. No.: 10/308,499

(22) Filed: Dec. 3, 2002

(51) Int. Cl.[7] ........................... B41J 2/435; B41L 27/26
(52) U.S. Cl. ..................................... 347/224; 101/125
(58) Field of Search ................................ 347/217, 218, 347/224; 430/258; 101/41, 125, 467

(56) References Cited

U.S. PATENT DOCUMENTS 5,333,548 A * 8/1994 Fadner ..................... 101/467
6,479,208 B1 * 11/2002 Robertson ................. 430/258
6,516,716 B1 * 2/2003 Robertson et al. ............ 101/41

* cited by examiner

*Primary Examiner*—Hai Pham
(74) *Attorney, Agent, or Firm*—Mueller and Smith, LPA

(57) ABSTRACT

A method for marking cold (e.g., about room temperature to 800° F.) substrate (e.g., glass, ceramic, metal) commences by creating a tape of a carrier backing bearing a laser ablatable, non-tacky coating with optional barrier and release coatings between the carrier backing and the coating. The coating is laser ablated to form one or more of alpha-numeric characters or graphics on the carrier backing. The ablated coating on the carrier backing is heated to form a tacky film of the coating on the carrier backing. The tacky film is roller transferred from the carrier backing onto a pliable transfer pad. Finally, the tacky film is roller transferred from the pliable transfer pad onto the cold substrate for its marking.

18 Claims, 3 Drawing Sheets

TAPE ROLLER/PAD/PRINTING USING A LASER ABLATED CARRIER

CROSS-REFERENCE TO RELATED APPLICATIONS

None

STATEMENT REGARDING FEDERALLY SPONSORED RESEARCH

Not applicable.

BACKGROUND OF THE INVENTION

The present invention generally relates to product identification and more particularly to the ability to mark cold glass, such as cold glass picture tube components.

Marking of cold glass becomes even more challenging when subsequent downstream processing involves high temperature, e.g., Lehr processing of glass picture tubes. Another example is flat glass where individual pieces require bar code identification when they are cut from a larger parent piece. These pieces may be later tempered. If they are tempered, the markings must survive high annealing temperatures, e.g., about 600° C. A further example is individual piece identification of catalytic converter ceramic cores, which may need to survive high temperature (e.g., 600° C.) temperatures during downstream coating and curing processing.

Glass part manufacturers and processors require individual piece marking, which may be produced and/or applied on-site and, when used, provides high contrast (e.g., black/white) man readable and/or machine readable (e.g., bar code) indicia that can be read using standard readers (e.g., bar code readers).

U.S. Pat. No. 6,479,208 discloses labels that are produced onto hot (e.g., just out of the mold) glass components by a tape transfer technique. The present invention is addressed to the marking of a wide variety of relatively cooler (from ambient temperature to about 800° F.) glass pieces, which may or may not experience high temperature downstream processing.

BRIEF SUMMARY OF THE INVENTION

A method for marking cold (e.g., about room temperature to 800° F.) substrates (e.g., glass, ceramics, metals) commences by creating a tape of a carrier backing bearing a laser ablatable, non-tacky coating with optional barrier and release coatings between the carrier backing and the coating. The coating is laser ablated to form one or more of alphanumeric characters or graphics on the carrier backing. The ablated coating on the carrier backing is heated to form a tacky film of the coating on the carrier backing. The tacky film is roller transferred from the carrier backing onto a pliable transfer pad. Finally, the tacky film is roller transferred from the pliable transfer pad onto the cold substrate for its marking.

BRIEF DESCRIPTION OF THE DRAWINGS

For a fuller understanding of the nature and advantages of the present invention, reference should be had to the following detailed description taken in connection with the accompanying drawings, in which.

The drawings will be described in detail below.

DETAILED DESCRIPTION OF THE INVENTION

Figure 1:
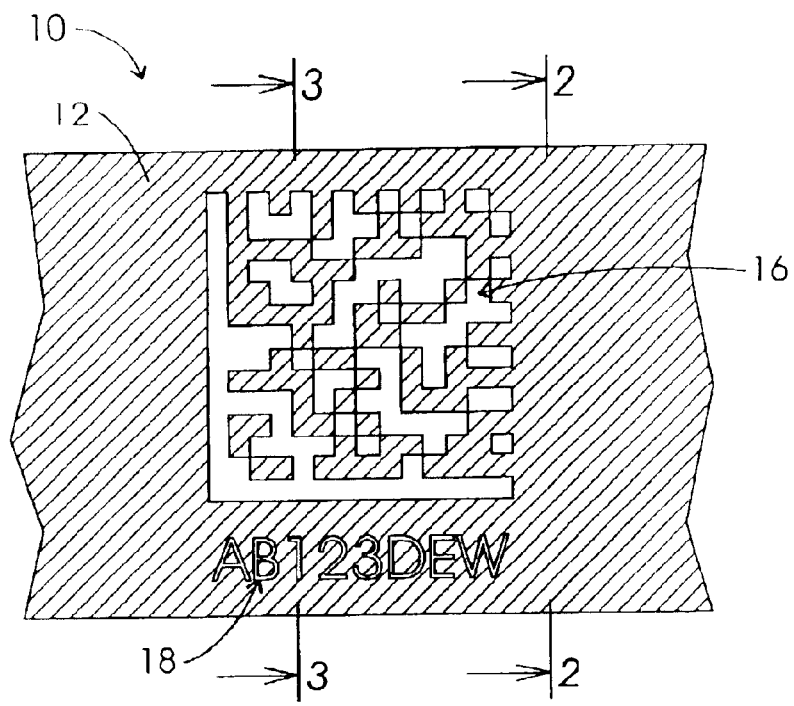
FIG. 1 is a plan view of a carrier backing bearing a laser ablatable, non-tacky coating wherein an area has been laser ablated to produce a machine-readable code.
Figure 2:
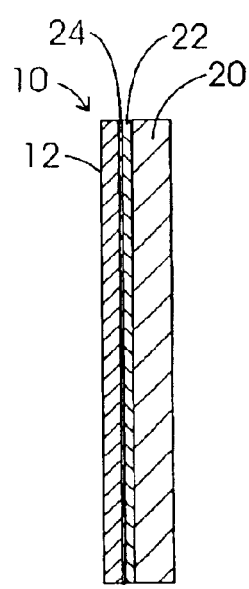
FIG. 2 is a cross-sectional view taken along line 2—2 of FIG. 1.

Referring initially to FIG. 1, a carrier backing assembly, 10, is seen to bear a dark coating, 12, that has been ablated to reveal a machine-readable identification indicia, 16, and a human-readable indicia, 18. The construction of carrier backing assembly 10 is seen in FIG. 2. In particular, carrier backing assembly 10 is seen to be composed of a carrier backing, 20, which may be formed from paper, typically about 0.001 to 0.050 inches thick, or other convenient material. Carrier backing 20 optionally is coated with a barrier film, 22, which typically will be a metal or polyester film. Atop barrier film 22 optionally will be a release coating, 24. Atop this laminate structure is coated a laser ablatable, non-tacky coating, 12. Coating 12 should be non-tacky so that it can be handled and carrier backing assembly 10 processed in accordance with the present invention.

An advantageous coating is a methylphenyl siloxane resin-based coating containing a colorant pigment and which is coated to between about 0.0005 and 0.020 inches in thickness. For white colored coatings, $TiO_2$ is a convenient pigment. For black (dark) coatings, ferric oxide is a convenient coating. While coating 12 is seen to be dark in color in the drawings, such is for illustration purposes only. Of importance is that coating 12 be contrasting in color from the substrate that it is to be applied to for identification and marking purposes.

Siloxone resin coatings are well known, such as described in "Silicone Resin Emulsions for High Temperature Coatings", Modern Paint and Coatings, September 1993, Argus, Inc., Atlanta, Ga. (1993). Phenyl and methyl substituted resins are well known in the art, such as represented by D. H. Solomon, *The Chemistry of Organic Film Formers*, Second Edition, Robert E. Krieger Publishing, Inc., pp. 334 et seq. (1977). The disclosures of the cited references are expressly incorporated herein by reference.

Figure 3:
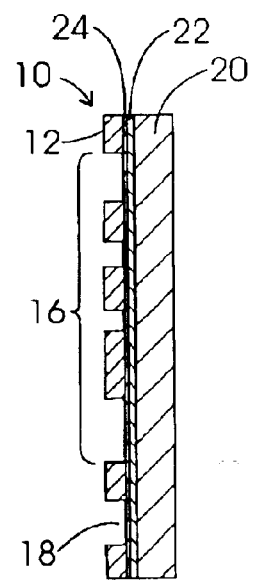
FIG. 3 is a cross-sectional view taken along line 3—3 of FIG. 1.

In FIG. 3, a portion of coating 12 has been removed by laser ablation to reveal pattern or code 16 (so-called 2D bar code symbology) that is machine readable and alphanumeric characters 18 that are human readable. It will be appreciated that a variety of different machine-readable codes could be created from coating 12, as well as graphics. In this regard, it is not necessary to always create both machine readable and human readable codes, as each set could be created separately as is necessary, desirable, or convenient it should be noted that indicia 16 is a positive (non-mirror) image of the desired indicia to applied to the substrate or piece for marking and identification.

Machine-readable indicia 16 and human readable alphanumeric characters 18 desirably are created using a focused $CO_2$ laser, because sealed units with long (>10,000 operating hours) lives are available commercially. Other lasers, such as a YAG laser, can ablate a wider variety of alternate coating materials, but have a much shorter life and, therefore, may not be suitable for many industrial environments. Optional barrier film 22 and release coating 24 may assist in the ablative laser removal of coating 12 at reduced laser power.

A presently preferred formulation for coating 12 involves 22 g of SILIKOPHEN® P 80/X methyl phenyl resin (Goldschmidt Chemical Corp., Hopewell, Va.), 33 g of organic solvent (e.g., xylene or toluene), and 9.5 g of $TiO_2$ pigment, for a white coating. This formulation can be drawn down with a #20 Mayer rod atop acrylic barrier 22 coated 20-weight paper (carrier backing 20).

The transfer process involves the pickup of the coating pattern (indicia) onto a pad and transfer of the coating pattern onto the piece (substrate) to be marked. This transfer process involves the interaction of several variables: heat, time, nip (e.g., peeling action), pad surface receptivity, and piece surface receptivity. These variables will be discussed as the transfer process is described below. It should be noted that a simple, even heated, flat transfer pad has been determined to be unreliable in both pickup of the coating pattern from the carrier backing and in transfer of the coating pattern onto the piece to be marked. This unreliability is due to the flatness of the pad and its lacking of a "nip" or pinch point, which facilitates peeling of the film (coating pattern) transfer either onto or off of the transfer pad. The present invention, then, employs "roller transfer" of the pattern so that a nip action is created to facilitate transfer of the coating from the carrier backing onto the pad and then from the pad to the substrate to be marked. The pad, therefore, is cylindrical, convex, or other non-linear shape so that rolling or pressing the pad onto the tape and onto the substrate creates a moving nip action.

Figure 4:
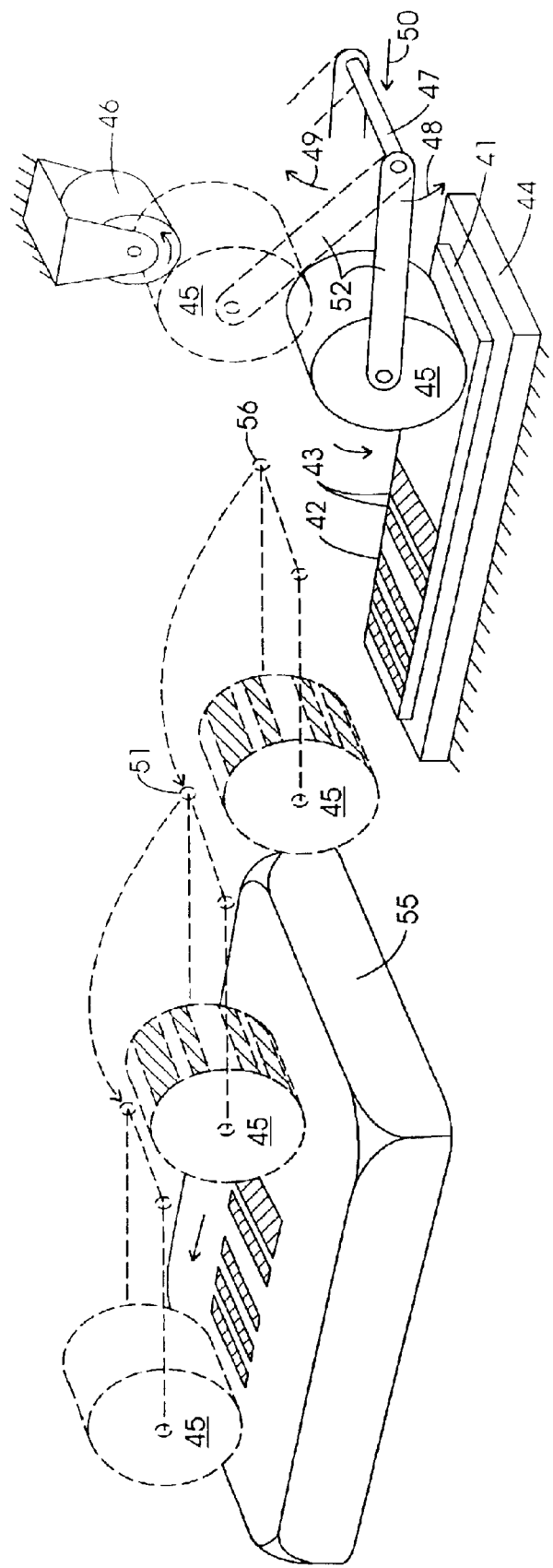
FIG. 4 is a simplified perspective view of one embodiment of the process wherein a machine readable code is transferred onto a substrate (piece) for its identification.

Referring now to FIG. 4, in which one embodiment of the transfer process is illustrated, a carrier backing in the form of a tape, 41, bearings a coating, 42, which has been ablatively removed, such as in region 43. Tape 41 is momentarily advanced to the position shown in FIG. 4 where it rests atop a fixed heated surface, 44, which has been heated to, say, 375° F. In this regard, an important consideration is that tape 41 not remain atop (in contact with) heated surface or plate 44 for more than, say, about 2 to 10 seconds (for the preferred formulation given above). If tape 41 resides atop heated plate 44 too long, the siloxane coating will cure (polymerize) and proper "tack" transfer onto the transfer roller will not be possible. Because of this time limitation, tape 41 preferably is not advanced to rest atop plate 44 until after the transfer roller 45 has been pre-heated. It should also be apparent that the backside of tape 41 is being heated with coating 42 remaining away from contact with plate 44.

Returning to FIG. 4, a compliant transfer roller, 45, conveniently made from a silicone rubber, is slowly rotated (say, about 1 revolution per second) against a driven, rotating/fixed position heated, pre-heating roller, 46, which can be made from a metal and held at a temperature of, say, around 250° F. Transfer roller 45 is held by an amp assembly, 52, which can be pivoted by a pivot mechanism not shown in the direction of arrow 49 for pressing transfer roller 45 against pre-heating roller 46 for pre-heating the outer surface of compliant roller 45.

Alternative heating methods can be envisioned for pre-heating transfer roller 45. For example, transfer roller 45 could be placed inside a heated chamber where it could be pre-heated by a flow of hot air, surface contact, radiant heat, or a combination thereof. To assure uniform heating of the outer surface of transfer roller 45, it may be necessary to rotate roller 45 within the heating chamber. It also would be possible to heat roller 45 by the core about which it rotates with a resistance heater (using rotating electrical contacts) or even by heating the metallic or otherwise conductive core of roller 45 by induction heating. Additional heating methods may be evident to the skilled artisan based on the precepts of the present invention and are to be regarded as part of the instant disclosure.

Two important considerations involving pre-heating roller 45 should be recognized. The first consideration is that if roller 45 is not sufficiently heated, coating 42 will quickly harden on the outer surface of roller 45 and transfer of coating 42 to the piece will not result. The second consideration is that is roller 45 is too hot coating 42 will melt and lack sufficient "tack" to affix itself to transfer roller 45 as a complete image. Thus, temperature control of the outer surface of transfer roller 45 is an important consideration for successful practice of the present invention, but such temperature control is well within the ability and capability of present day manufacturing operations and should present little difficulty to implement.

Once transfer roller 45 is pre-heated, imaged (laser ablated) tape 41 is brought into position atop heater plate 44 and, after an appropriate residence time (heating delay), transfer roller arm assembly 52 pivots downwardly about a pivot rod, 47, using an actuator (not shown in the drawings). Such rotation brings transfer roller 45 into contact with the imaged face of tape 41. Movement of pivot rod 47 in the direction of arrow 50 by a translating actuator (not shown in the drawings) then rolls transfer roller across the imaged surface of tape 41 and, given the proper time, temperature, coating formulation, and roller receptivity, transfer roller 45 will pick up the non-ablated areas of coating (e.g., coating 42), such that when pivot rod 47 reaches location 56, transfer roller 45 bears the desired image about its outer surface.

Pivot rod 47, then, advances transfer roller 45 further to position 51 where it can be lowered by an actuator (not shown) against the piece or substrate to be marked, 55. The translating actuator next translates transfer roller 45 across the upper surface of piece 55. Given the proper time, temperature, coating formulation, and piece receptivity, coating 42 will be transferred onto piece 55 and the marking transfer process will be complete. Roller 45 then can be elevated and the translating actuator can be reversed to return roller 45 to its pre-heating position where it again bears against heating roller 46, thereby completing one cycle of the marking process. The marking process then can be initiated again for marking of a subsequent piece or for applying a second mark to piece 55.

Virtually any surface can be marked by the inventive technique disclosed herein. Thus, the "cold" substrate being marked can be a glass, a ceramic, or a metal, including substrates manufactured from combinations of these materials. Coating 12 may need to be formulated especially for the substrate of choice to be marked, but then this is well within the skill of those in this art field.

Figure 5:
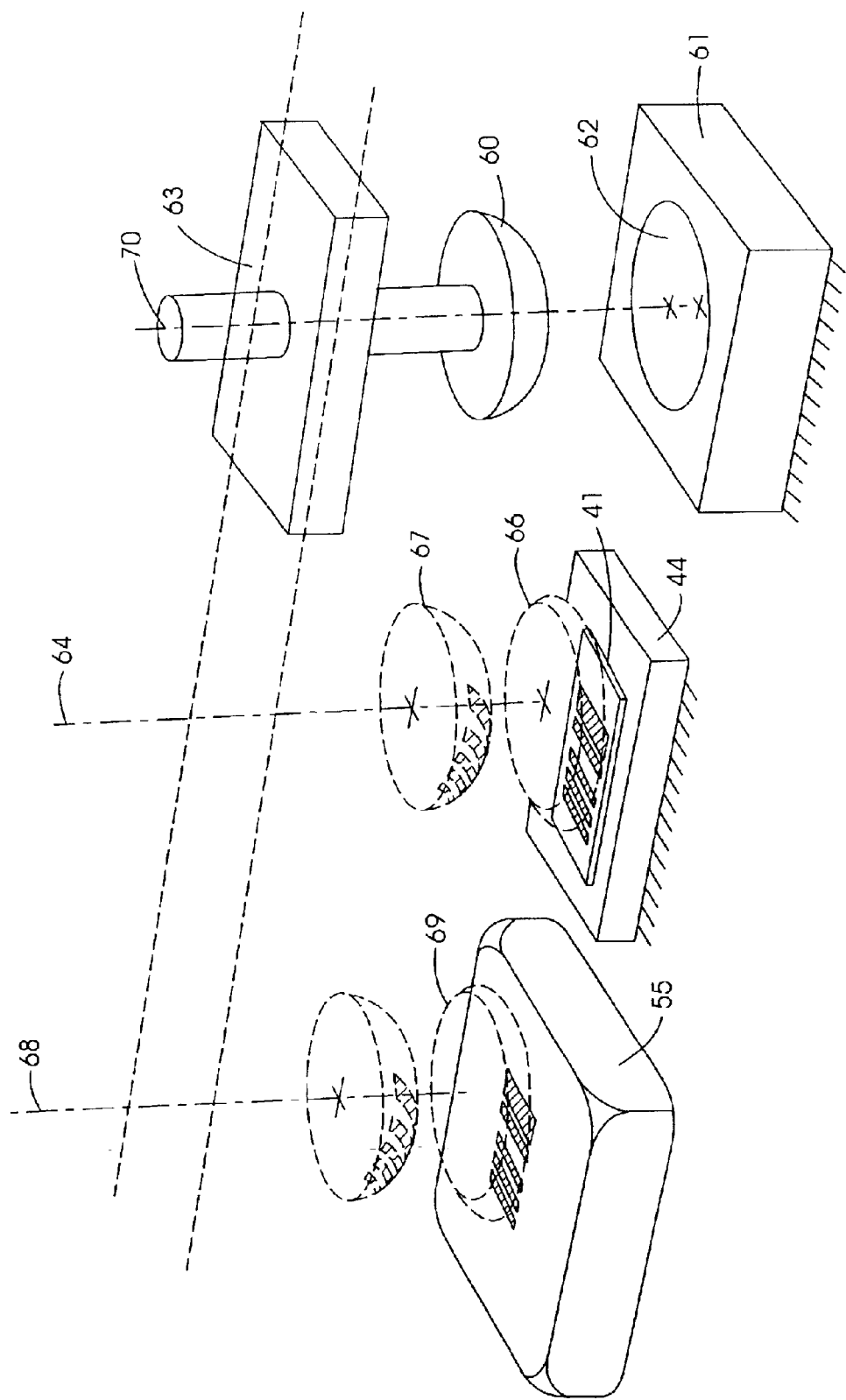
FIG. 5 is a simplified perspective view of a second embodiment of the process wherein a machine-readable code is transferred onto a substrate for its identification.

An alternative transfer process is illustrated in FIG. 5. In this alternative embodiment, transfer of the coating is accomplished using a non-planar pad. In particular, a transfer pad, 60, is convex in shape and can be formed from silicone rubber or other similar material. Pad 60 is heated while in position at centerline 70 by pressing it with an actuator (not shown) downwardly against a heating block, 61, which contains an optional seating cavity, 62, that conformingly mates with pad 60.

Transfer pad 60 then is translated laterally by a slide mechanism, 63, to the position indicated at centerline 64, where actuator 63 lowers and compresses transfer pad 60 to position 66 atop previously laser ablated tape 41, which in turn rests atop heater plate 44. In this alternative embodiment, convex transfer pad 60 picks up the remaining coating (e.g., coating 42 (FIG. 4) and, given the proper time, temperatures, coating composition, and transfer pad surface receptivity, pad 60 lifts the coating off of tape 41 to position 67.

Transfer pad 60 then is translated again by slide mechanism 63 to the position indicated by centerline 68 where pad 60 is lowered and compressed to position 69 against piece 55. Given the proper time, temperature, coating formulation, and piece receptivity, coating 42 will be transferred onto piece 55 and the marking transfer process will be complete.

Translation mechanism 63 then returns transfer pad 60 back to position 70 to complete one cycle. The process now is ready for repeating.

It should be understood that the same considerations discussed above with respect to the first embodiment apply to this second embodiment as well.

A consideration in this second embodiment is that pickup of coating material at centerline 64 and deposition of the coating material at centerline position 68 requires that the transfer pad surface "rolls" or "presses" onto the coating at the centerline at position 64 and similarly rolls its surface onto piece 55 at position 68. This rolling creates a moving point nip as the pad is compressed and de-compressed. The transferred image is shown to be on only one side of pad 55 and is not present at the "nose" or center of pad 55 where there is little or no nip action as the pad is compressed. In this regard, the moving point nip produced by pad 55 as it is compressed acts to produce a moving nip as was utilized in the preceding roller pad example using transfer roller 45.

While the invention has been described with reference to preferred embodiments, those skilled in the art will understand that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed as the best modes contemplated for carrying out this invention, but that the invention will include all embodiments falling within the scope of the appended claims. In this application all units are in the American system and all amounts and percentages are by weight, unless otherwise expressly indicated. Also, all citations referred herein are expressly incorporated herein by reference.

I claim:

1. Method for marking a substrate, which comprises the steps of:
   (a) creating a tape comprising a carrier backing bearing a laser ablatable, non-tacky coating;
   (b) laser ablating said coating to form one or more of alphanumeric characters or graphics on the carrier backing;
   (c) heating said ablated coating on said carrier backing to form a tacky film of said coating on said carrier backing;
   (d) roller transferring said tacky film from said carrier backing onto a pliable transfer pad; and
   (d) roller transferring said tacky film from said pliable transfer pad onto said substrate for its marking.

2. The method of claim 1, wherein said substrate is one or more of glass, ceramic, or metal.

3. The method of claim 1, wherein said substrate ranges in temperature from about room temperature to 800° F.

4. The method of claim 3, wherein said substrate is one or more of glass, ceramic, or metal.

5. The method of claim 1, wherein interposed between said carrier backing and said non-tacking coating is one or more of a barrier film or a release coating.

6. The method of claim 1, wherein said coating comprises a siloxane coating.

7. The method of claim 1, wherein said laser ablating is accomplished with a $CO_2$ laser.

8. The method of claim 1, wherein said pliable transfer pad comprises a first cylindrical roller.

9. The method of claim 8, wherein said first cylindrical roller is heated prior to step (d).

10. The method of claim 9, wherein first cylindrical roller is rolled against a second cylindrical heated roller for heating of said first cylindrical roller.

11. The method of claim 9, wherein said heated first cylindrical roller is mounted on a central spindle and rolled across said tape to pick up said ablated coating.

12. The method of claim 11, wherein said heated first cylindrical roller is rolled across said substrate to transfer said ablated coating onto said substrate.

13. The method of claim 1, wherein said pliable transfer pad comprises a first convex transfer pad.

14. The method of claim 13, wherein convex transfer pad is heated prior to step (d).

15. The method of claim 14, wherein convex transfer pad is placed in a heated cavity for heating of convex transfer pad.

16. The method of claim 13, wherein convex transfer pad is mounted to an actuator which presses said convex transfer pad onto said tape to pick up said ablated coating.

17. The method of claim 16, wherein said actuator presses said convex transfer pad onto said substrate to transfer said ablated coating onto said substrate.

18. The method of claim 16, wherein said ablated coating is transferred onto the convex transfer pad adjacent to, but not on, the nose of said convex transfer pad.

* * * * *